United States Patent
Naritomi et al.

(10) Patent No.: US 9,724,898 B2
(45) Date of Patent: Aug. 8, 2017

(54) COMPOSITE OF METAL AND RESIN AND METHOD FOR MANUFACTURING SAME

(71) Applicant: TAISEI PLAS CO., LTD., Tokyo (JP)

(72) Inventors: Masanori Naritomi, Tokyo (JP); Naoki Andoh, Tokyo (JP); Naoki Yamano, Yokkaichi (JP)

(73) Assignee: TAISEI PLAS CO., LTD., Tokyo (JP)

( * ) Notice: Subject to any disclaimer, the term of this patent is extended or adjusted under 35 U.S.C. 154(b) by 550 days.

(21) Appl. No.: 14/197,439

(22) Filed: Mar. 5, 2014

(65) Prior Publication Data

US 2014/0186641 A1   Jul. 3, 2014

Related U.S. Application Data

(62) Division of application No. 12/089,097, filed as application No. PCT/JP2006/319864 on Oct. 4, 2006, now Pat. No. 8,703,272.

(30) Foreign Application Priority Data

Oct. 4, 2005   (JP) .................................. 2005-290627
May 25, 2006   (JP) .................................. 2006-145707

(51) Int. Cl.
   *C23C 22/07*   (2006.01)
   *C23C 22/78*   (2006.01)
   (Continued)

(52) U.S. Cl.
   CPC ........ *B32B 27/06* (2013.01); *B29C 45/14311* (2013.01); *B32B 15/08* (2013.01);
   (Continued)

(58) Field of Classification Search
   CPC ..... B29C 2045/14237; B29C 45/14311; B29C 45/14778; B29K 2705/00; B29K 2705/02;
   (Continued)

(56) References Cited

U.S. PATENT DOCUMENTS

| | | | |
|---|---|---|---|
| 4,929,665 A | 5/1990 | Inoue et al. | |
| 5,604,040 A | 2/1997 | Sugama | |

(Continued)

FOREIGN PATENT DOCUMENTS

| | | |
|---|---|---|
| JP | 59-207921 A | 11/1984 |
| JP | 2001-192854 A | 7/2001 |

(Continued)

OTHER PUBLICATIONS

International Search Report of PCT/JP2006/319864, date of mailing Dec. 26, 2006.

(Continued)

*Primary Examiner* — Lois Zheng
(74) *Attorney, Agent, or Firm* — Westerman, Hattori, Daniels & Adrian, LLP

(57) ABSTRACT

A magnesium alloy part is inserted into a mold, a resin composition is injected and joined to the part, and a composite is obtained. A part having, formed thereon, a surface layer of a metal oxide, a metal carbonate, or a metal phosphate in use of a usual conversion treatment or a modification method thereof can be used for the magnesium alloy plate 1. The surface that has a larger amount of crystal-like objects of a nanolevel on the surface layer composed of the metal oxide, metal carbonate, or metal phosphate has a higher level of hardness, microscopic roughness, and good injection joining force, and these parameters can be controlled by a conversion treatment method. A resin composition 4, containing PBT or PPS as the main component, is used as the resin composition part.

2 Claims, 4 Drawing Sheets

(51) Int. Cl.
*B32B 27/06* (2006.01)
*B29C 45/14* (2006.01)
*B32B 15/08* (2006.01)
*C23C 22/05* (2006.01)
*C23C 22/18* (2006.01)
*C23C 22/57* (2006.01)
*C23C 22/83* (2006.01)
*C23F 1/22* (2006.01)
*C23C 22/00* (2006.01)
*B29K 705/00* (2006.01)
*B29K 705/02* (2006.01)

(52) U.S. Cl.
CPC ............... *C23C 22/05* (2013.01); *C23C 22/18* (2013.01); *C23C 22/57* (2013.01); *C23C 22/83* (2013.01); *C23F 1/22* (2013.01); *B29C 45/14778* (2013.01); *B29C 2045/14237* (2013.01); *B29K 2705/00* (2013.01); *B29K 2705/02* (2013.01); *Y10T 29/4998* (2015.01); *Y10T 428/24355* (2015.01); *Y10T 428/269* (2015.01); *Y10T 428/31529* (2015.04); *Y10T 428/31678* (2015.04); *Y10T 428/31681* (2015.04)

(58) Field of Classification Search
CPC .......... C23C 22/05; C23C 22/18; C23C 22/57; C23C 22/83
See application file for complete search history.

(56) References Cited

U.S. PATENT DOCUMENTS

| | | |
|---|---|---|
| 6,238,783 B1 | 5/2001 | Komai et al. |
| 2004/0137246 A1 | 7/2004 | Fristad et al. |
| 2005/0175798 A1 | 8/2005 | Kurokawa et al. |
| 2006/0025764 A1 | 2/2006 | Rioux et al. |

FOREIGN PATENT DOCUMENTS

| | | | |
|---|---|---|---|
| JP | 2004-035963 | * 2/2004 | ............... B25D 3/10 |
| JP | 2004-35963 A | 2/2004 | |
| JP | 2005-97712 A | 4/2005 | |
| JP | 2005-144674 A | 6/2005 | |

OTHER PUBLICATIONS

Kouisni et al., "Phosphate coating on magnesium alloy AM60 part 1: study of the formation and the growth of zinc phosphate films", Surface & Coatings Technology, vol. 185, pp. 58-67, Jul. 1, 2004.
Narayanan, "Surface Pretreatment by Phosphate Conversion Coatings—a Review", Reviews on Advanced Materials Science, vol. 9, pp. 130-177, Jul. 17, 2005, http://www.ipme.ru/e-journals/RAMS/no_2905/contents.html.

* cited by examiner

COMPOSITE OF METAL AND RESIN AND METHOD FOR MANUFACTURING SAME

CROSS-REFERENCE TO RELATED APPLICATION

This application is a Divisional of copending U.S. application Ser. No. 12/089,097 filed Jun. 2, 2009, and wherein application Ser. No. 12/089,097 is a national stage application filed under 35 U.S.C. §371 of International Application No. PCT/JP2006/319864, filed on Oct. 4, 2006, which is based upon and claims priority under 35 U.S.C. §119(a) to Japan Patent Application Nos. 2005-290627 and 2006-145707 filed Oct. 4, 2005 and May 25, 2006, respectively.

TECHNICAL FIELD

The present invention relates to a composite of a metal and a resin that is composed of a metal and a resin composition suitable for casings of electronic devices, housings of home electric appliances, structural components, machinery parts, and the like, and also to a method for manufacturing the composite. More specifically, the present invention relates to a composite in which a base material made from a magnesium alloy that has been produced by various types of mechanical processing and a thermoplastic resin composition are integrated to be laminated, and also to a method for manufacturing the composite. Thus, the present invention relates to a composite of a metal and a resin that is suitable for various electronic devices, electric apparatuses, medical devices, automobiles, railroad trains, aircrafts, vehicle-mounted parts, structural components such as building materials and external trim parts.

BACKGROUND ART

A technology for integrating metals and synthetic resins is needed in a wide range of industrial fields including the production of parts for automobiles, domestic electric appliances, industrial machinery, and the like, and a large number of adhesives have been developed therefor. Among them, excellent adhesives have been developed. For example, adhesives demonstrating adhesive functions at normal temperature or under heating are used for integrally joining metals and synthetic resins, and such a method is presently a generally employed joining technology.

However, more rational joining methods that use no adhesives have also been studied. An example of such methods is a method for integrating high-strength engineering plastics, without using an adhesive, with light metals such as magnetism, aluminum, and alloys thereof or iron alloys such as stainless steel. For example, the inventors have suggested a method for injecting a molten resin onto a metal part that has been inserted in advance into an injection molding mold, molding the resin part and simultaneously fixing (joining) the molded part and the metal part (this method will be referred to hereinbelow as "injection joining").

This invention suggests a manufacturing technology by which a polybutylene terephthalate resin (referred to hereinbelow as "PBT") or a polyphenylenes sulfide resin (referred to hereinbelow as "PPS") is injection joined to an aluminum alloy (for example, see Patent Document 1). A joining technology has also been suggested by which a large hole is provided in an anodization film on an aluminum material and bonding is performed by filling the hole with a synthetic resin body (for example, see Patent Document 2).

The principle of the injection joining suggested in the Patent Document 1 will be explained below. An aluminum alloy is immersed into a dilute aqueous solution of a water-soluble amine compound, and the aluminum alloy is finely etched by a weak basicity of the aqueous solution. Further, it has been found that the adsorption of the amine compound molecules on the aluminum alloy surface simultaneously occurs during the immersion. The aluminum alloy subjected to such treatment is placed as an insert into an injection molding mold and a molten thermoplastic resin is injected under a high pressure.

In this case, heat is generated by the interaction of the thermoplastic resin and amine compound molecules adsorbed on the aluminum alloy surface. Almost simultaneously with this heat generation, the thermoplastic resin comes into contact with the aluminum alloy that has been held at a low temperature of the mold and is rapidly cooled. As a result, solidification of the resin that has to crystallize and solidify is delayed and it penetrates into ultrafine concavities present on the aluminum alloy surface. As a consequence, the aluminum alloy and thermoplastic resin are strongly joined (fixed), so that the resin does not peel from the aluminum alloy surface. Thus, where the exothermal reaction occurs, strong injection joining becomes possible. It has actually been confirmed that PBT or PPS that can participate in exothermal reactions with amine compounds can be injection joined to aluminum alloys.

Patent Document 1: Japanese Patent Application laid open No. 2004-216425
Patent Document 2: International Patent Application WO2004/055248 A1

DISCLOSURE OF THE INVENTION

The inventors have searched for and developed resin compositions that are suitable for injection joining employing the above-described inventions with better efficiency. Thus, a bonding technology in which a very large number of fine concavities are provided on a metal surface has been further advanced and developed. As a result, it has been established not only that simple PBT- or PPS-based compositions that have a linear thermal expansion coefficients matching those of aluminum alloys are optimum for joining, but also that physical properties relating to crystallinity of the two resins have even stronger correlation with injection joining. The inventors have also focused attention on the surface layer of the metal that is to be injection joined. The results obtained made it possible to understand specific features of crystallinity of PBT and PPS. Accordingly, it has been inferred that there is also a possibility of joining by injection molding to alloys other than the aluminum alloys subjected to ultrafine etching for which such possibility has heretofore been established. This inference will be described below in greater details.

In general, there seems to be two conditions enabling the injection joining of a thermoplastic resin to a metal shaped body. The first condition is the presence of a metal surface layer having convexities and concavities on a micrometer level, this surface with convexities and concavities being a hard surface, and also the presence of convexities and concavities having a shape on an electron microscope level (ultrafineness on a nanolevel). Where large concavities on a micrometer level are present, PBT or PPS can penetrate therein in addition to the adsorption of amine molecules. The second condition is that the resin is a crystalline resin with a high crystallization ratio and also high hardness and mechanical strength of the crystallized portion of the resin, these properties being at a level suitable for fixing the resin. More specifically, the resin is PBT or PPS. Where injection molding is performed under such two conditions, when the molten resin comes into contact with a low-temperature mold or insert metal that has a temperature by about a hundred degrees lower than the melting point of the resin and is rapidly cooled, the crystallization and solidification of the resin can occur inside the concavities on the metal surface. In such case, a strong joining (fixing) of the resin and metal occurs.

The possibility of obtaining a stronger injection joint by improving the above-described resin composition can be named as a preferred condition (third condition) for injection joining. Thus, the resin composition having crystallinity is improved so that the resin composition crystallizes and solidifies during rapid cooling, but the solidification rate thereof is decreased. Thus, even if the resin is rapidly cooled to a temperature lower than the resin melting point, the seed crystals do not occur from the resin and do not grow, causing solidification, immediately thereafter. An overcooled state is assumed and the resin is maintained in a molten state for a certain extremely short interval. It was assumed that the overcooling time can be delayed by admixing the resin with a certain other resin.

The minimum size of seed crystals, that is, the resin crystals, is about 10 nm or larger, and after the seed crystals have appeared and grown, even if they find their way to the entry of ultrafine concavities with a diameter of 20 to 80 nm, apparently it will not be easy for the seed crystals to reach the farthest zones of the concavities. However, if a resin composition is employed in which seed crystals do not appear at once during rapid solidification and subsequent crystal growth is somewhat delayed, then the resin will be able to penetrate into concavities even when the diameter of concavities is several hundred nanometers. Where the surface inside the concavities is rough, once the resin composition has crystallized and solidified inside the concavities, it will be difficult to pull the resin composition out, and in this case, an even stronger joint can be obtained.

Magnesium alloys are lighter than aluminum alloys, this being a major feature of magnesium alloys, and they also have chemical activity much higher than that of aluminum alloys. Immediately after a metal surface in a magnesium alloy is exposed, e.g. by polishing, a natural oxidation layer appears, thereby imparting a certain degree of stability. However, the degree of stability or density of the natural oxidation layer are greatly inferior to those of the oxidation coating layer on aluminum alloys. For example, if a paint coating film or an oil film of a corrosion inhibitor is present on a natural oxidation layer in an aluminum alloy, a stability of more than 10 years is ensured in an indoor environment without condensation. By contrast, bulging or corrosion appears in magnesium alloys in a year or earlier. This is because water molecules that diffused through the oil film of coating film also penetrate through the natural oxidation layer and oxidize magnesium. Thus, in order to use magnesium alloys, they have to be covered with a dense coating film instead of the natural oxidation layer film.

More specifically, magnesium alloys are treated by a suitable method such as conversion treatment or electrolytic oxidation, and presently conversion treatment is a generally employed method. From the standpoint of practical utility, the inventors have established a technology enabling the injection joining of resins also to magnesium alloys subjected to conversion treatment. Fortunately, the surface of a magnesium alloy subjected to conversion treatment is covered with a metal oxide, a metal carbonate, or a metal phosphate that is much harder than the base material that is the metal itself. This matches the condition relating to the metal surface, of the two above-described conditions needed for injection joining, that is, that the surface be covered with convexities and concavities of a hard substance.

The present invention is based on the above-described theoretical inference and attains the below-described objects.

Thus, it is an object of the present invention to provide a composite of a metal and a resin, in which a resin layer containing PBT or PPS as the main component can be strongly joined to a magnesium alloy and also a method for manufacturing the composite.

It is another object of the present invention to provide a composite of a metal and a resin in which a base material composed of a magnesium metal that has a surface layer subjected to conversion treatment and excels in corrosion resistance is integrated with a resin composition containing PBT or PPS as the main component and also a method for manufacturing the composite.

It is yet another object of the present invention to provide a composite of a metal and a resin that has high mass production ability and productivity when a thermoplastic resin composition containing PBT or PPS as the main component is molded by injection molding and to a method for manufacturing the composite.

The present invention employs the following means for attaining the above-described objects.

The gist of the composite of a metal and a resin in accordance with the present invention resides in that the composite comprises: a base material comprising a magnesium alloy; a surface layer having, formed on a surface of the magnesium alloy, any one from among a metal oxide, a metal carbonate, and a metal phosphate obtained by preparing an aqueous solution of at least one kind selected from chromium, manganese, vanadium, calcium, zinc, strontium, zirconium, titanium, and an alkali metal carbonate and performing a conversion treatment by using the aqueous solution; and a resin layer that has, as a main component, a polybutylene terephthalate resin or a polyphenylenes sulfide resin, which is a thermoplastic resin having crystalline property, and which is introduced into concavities of the surface layer by injection molding, solidified, and fixed thereto.

A gist of the method for manufacturing a composite of a metal and a resin in accordance with the present invention resides in that the method comprises: a shaping step of obtaining a shaped part from a cast article or an intermediate product composed of a magnesium alloy by shaping by mechanical processing; a conversion treatment step of forming one species, selected from a metal oxide, a metal carbonate, and a metal phosphate, on a surface layer of the shaped part; an injection step of inserting the shaped part subjected to the liquid treatment step into an injection molding mold and injecting a molten resin composition comprising polybutylene terephthalate or polyphenylene sulfide as a main component; and a fixing step of introducing and solidifying by the injection molding in concavities of the metal oxide or metal phosphate and integrally fixing the shaped part and the resin composition.

The main features constituting the present invention will be described below in greater details.

[Base Material]

The base material as referred to in the description of the present invention means a metal portion constituting the composite. Suitable base materials include commercial products such as alloys for forging and rolling such as AZ31 system and alloys for casting such as AZ91 system that are stipulated in Japanese Industrial Standards (JIS) and all the well-known magnesium alloys. Among magnesium alloys for casting, semiproducts that are formed to the desired shape by an appropriate molding means such as die casting, thixomolding, or injection molding, or machinery parts obtained by further machining the semiproducts to the desired shape can be used as the base material. Among alloys for forging and rolling, sheets, rods, angular members, and tubes that are commercial products, or parts formed by subjecting them to mechanical processing such as pressing, cutting, or polishing can be used as the base materials.

[Surface Layer of Base Material (Metal Oxide, Metal Carbonate, or Metal Phosphate)]

The surface layer as referred to in the description of the present invention means a metal oxide, a metal carbonate, or a metal phosphate formed on the surface of the base material composed of a magnesium alloy. It is preferred that the substance constituting the surface layer be harder than the base material and have a high mechanical strength. Because the surface of magnesium alloys usually has a high ionization tendency and is easily corroded and oxidized even by moisture from the air, a surface treatment is required. For this reason, a stable layer of a metal oxide, a metal carbonate, or a metal phosphate containing a dissimilar metal is typically formed on the magnesium or magnesium alloy surface by immersing in an aqueous solution of the dissimilar metal salt or an acid, thereby protecting the metal on the inner side from corrosion by the presence of the layer.

A layer of a metal phosphate, a metal carbonate, or a metal oxide is formed on the surface of the base material in accordance with the present invention by dipping into an aqueous solution. This is because when a magnesium alloy that has a high ionization tendency and is easily corroded and oxidized even by moisture from the air is immersed in an aqueous solution of a dissimilar metal salt or an acid, a stable layer of oxide, carbonate, or phosphate of the dissimilar metal and/or magnesium is formed on the surface, thereby protecting the metal on the inner side from corrosion by the presence of the layer. Such an immersion process is called a conversion treatment in the industry of the metal surface treatment.

The treatment that also includes degreasing or chemical etching performed as a pretreatment for the conversion treatment is often also referred to as the conversion treatment. In accordance with the present invention, in order not to mix the two treatments, the term "conversion treatment" will be used in a narrow meaning of a treatment performed to produce an anticorrosive layer, the treatment such as degreasing or etching that is performed as a pretreatment for the conversion treatment will be referred to as "pretreatment", and the entire process including both the pretreatment and the conversion treatment will be referred to as "liquid treatment".

A conversion treatment using no chromium is called a non-chromate treatment, and as far as the inventors know, a manganese-system treatment has been mainly used in recent years (see, for example, Japanese Patent Applications Laid-open Nos. 7-126858 and 2001-123274). Further, a method of forming a layer composed of a composite oxide of aluminum, vanadium, zinc, zirconium, titanium, and the like as an anticorrosive layer on the surface is also known as a non-chromate treatment (see, for example, Japanese Patent Applications Laid-open Nos. 2000-199077). Historically, a chromate treatment method using a chromium compound has been used for a long time as a treatment method that excels in anticorrosive ability.

However, because an aqueous solution of chromic acid is used for the chromate treatment, it creates problems since hexavalent chromium causing environmental pollution is contained therein. For this reason, a demand has been created for a conversion treatment method using no chromium. Accordingly, methods using the aforementioned manganese and other metals have been developed. In recent years, methods using manganese compounds have attracted attention as methods that can replace the chromate treatment. The base material employed in accordance with the present invention can be used when the surface treatment is performed by any of these methods.

According to the research results obtained by the inventors a more preferred material satisfies the following requirements: (1) a sufficient corrosion resistance, and (2) the presence of convexities and concavities on the surface layer obtained by conversion treatment and also the presence of large number of crystal-like substances on the surface, when viewed under an electron microscope. In accordance with the present invention, both the condition (1) and the condition (2) have to be met, but in accordance with the present invention, it was the condition (2) that was specifically studied. This is because magnesium or a magnesium alloy preferably has a hard and dense surface layer of a metal oxide, metal carbonate, or metal phosphate. The reason therefor is that an injection thermoplastic resin having crystallinity penetrates into the above-described hard and dense surface layer having convexities and concavities and crystallizes and solidifies therein, thereby ensuring a strong joining force.

Where the hard and dense surface layer obtained by conversion treatment has a surface shape with large convexities and concavities on a micrometer level ("with a micron-level roughness", if phrased differently) and nanolevel convexities and concavities on the surface of concavities, the resin is grasped by the metal surface, that is, the resin is caught on convexities and concavities of the metal surface layer, and a desirable anchor effect is demonstrated. More specifically, it is preferred that two or more plate-like crystals be observed on 1 $\mu m^2$, or that needle-like or rod-like crystals cover widely the surface or that aggregates having needle-like or rod-like crystals as an outer shell be connected to each other and cover the base material surface, those crystals requiring electron microscope observations. Further, it is also preferred that a large number of circular column with a diameter of about 10 nm and a length of about 100 nm be formed, those columns requiring electron microscope observations. However, the circular columns are not necessarily crystal substances.

When approximately two or more plate-like crystals are observed on 1 $\mu m^2$, the plate-like crystals act as walls of convexities and concavities, and they serve as a means for mechanically strong bonding, thereby effectively increasing the fixing strength. On the other hand, where the needle-like or rod-like crystals cover 30% or more of the surface, they serve as a natural and strong fixing means composed of convexities and concavities that effectively catch the resin and enable a higher injection joining force. Specific methods for implementing each of the aforementioned steps and how to approach them will be described below.

[Surface Treatment/Pretreatment of Magnesium or Magnesium Alloy]

The pretreatment as referred to in the description of the present invention is a pretreatment for forming a surface layer composed of a metal oxide, a metal carbonate, or a metal phosphate on the surface of a base material composed of a magnesium alloy. It is preferred that the base material composed of magnesium or a magnesium alloy be initially immersed into a degreasing tank to remove foreign matter such as a lubricant or chips that have adhered thereto in the course of machining. More specifically, it is preferred that a commercial degreasing agent for magnesium be dissolved in warm water to a concentration specified by the manufacturer, a magnesium alloy be immersed therein, and the alloy be thereafter washed with washing water. With the usual commercial products, the concentration is 5 to 10%, the liquid temperature is 50 to 80° C., and the immersion time is 5 to 10 min. The alloy is then immersed into an acidic aqueous solution and etched to dissolve the surface layer of the magnesium alloy part and remove the contaminants, remaining lubricant, and surfactant residues. The liquid used is preferably an organic carboxylic acid with pH 2.0 to 5.0; for example, a weakly acidic aqueous solution of acetic acid, propionic acid, citric acid, benzoic acid, or phthalic acid can be used.

Magnesium alloys other than high-purity magnesium with a magnesium purity close to 100% contain dissimilar metals. For example, alloys of AZ31 system and AZ91 system contain 3 to 9% aluminum and about 1% zinc, and aluminum or zinc are hardly dissolved in the etching process using the weakly acidic aqueous solution and precipitate on the surface. Therefore a step of dissolving and removing these precipitates and washing is required.

This is a step that represents the so-called smut removal. The aforementioned AZ31B and AZ91D alloys are usually subjected to a treatment in which they are first immersed into a weakly basic aqueous solution to dissolve an aluminum smut (first smut treatment) and then immersed into a strong basic aqueous solution to dissolve and remove a zinc smut (second smut treatment). In the aforementioned first smut treatment, a commercial aqueous solution of a degreasing agent for aluminum alloys can be used in a weakly basic range, and the inventors employed a method in which such commercial degreasing agent for aluminum is used at a concentration of 5 to 10% and the immersion is performed for several minutes in an aqueous solution at 60 to 80° C. Further, a method by which immersion was performed for 5 to 10 min in an aqueous solution of caustic soda with a concentration of 15 to 25% at 70 to 80° C. was employed for the second smut treatment.

[Surface Treatment/Conversion Treatment of Magnesium or Magnesium Alloy]

The conversion treatment as referred to in the description of the present invention serves to form a surface layer composed of a metal oxide, a metal carbonate, or a metal phosphate on the surface of a base material composed of a magnesium alloy. Once the above-described pretreatment has been completed, the conversion treatment that is called the main treatment in the liquid treatment is performed. The conversion treatment is usually implemented as a two-stage conversion treatment, that is, a treatment in which, first, fine etching is performed by immersing for a very short time in a weakly acidic aqueous solution and then the conversion treatment for magnesium alloys that represents the conventional technology is implemented in the improved form. In the fine etching process, a weakly acidic aqueous solution of an organic carboxylic acid, for example, acetic acid, propionic acid, citric acid, benzoic acid, phthalic acid or phenol, phenol derivatives, or the like, with pH 2.0-6.0 can be used, and a very short immersion time of 15 to 40 sec is preferred.

Further, the conversion treatment step used in accordance with the present invention is basically identical to the well-known conventional conversion treatment. Thus, this conversion treatment method is protected by a large number of patents, publicly known, and represents a well-known technology. Accordingly, detailed description thereof is omitted. Such conversion treatment process has also been suggested in which corrosion resistance of a magnesium alloy is improved by forming a metal oxide, a metal carbonate, or a metal phosphate in a surface layer by immersing the alloy in an aqueous solution or aqueous suspension containing at least one metal selected from chromium, manganese, vanadium, calcium, zinc, strontium, zirconium, a titanium compound, and an alkali metal carbonate. On the other hand, as far as the inventors know, the conversion treatment methods that have been actually commercialized include two methods: a chromating method by which the surface is coated with an oxide of chromium or a chromium oxide containing magnesium by immersing in an aqueous solution of a chromic acid system, and a method by which the surface is coated with a phosphoric acid compound of manganese by immersing in an aqueous solution of manganese phosphate system.

The use of hexavalent chromium is presently barred because of the effect produced thereby on human body. Accordingly, the latter of the above-described surface treatment methods becomes a predominant method and a transition is being made to a process that is referred to as a non-chromate method. For the inventors, the object of the conversion treatment is not only to impart corrosion resistance, but also to form a surface demonstrating a high mechanical strength in terms of material dynamics when injection joining is performed. The research results obtained by the inventors et al. demonstrate that sufficient corrosion resistance is obtained and an injection joined article with a certain strength is obtained by using either the conversion treatment of the type disclosed in the aforementioned patent application or the chromate and non-chromate treatment methods that have been conventionally used. However, when the metal surface of articles with especially good injection joining results are observed under an electron microscope, fine crystals are clearly observed and a fine nanolevel repeating structure is observed. Accordingly, a fine etching process is preferably performed to prepare an article in which crystals or fine repeating structure are observed in large amounts under an electron microscope.

A specific example of a conversion treatment process that is considered as one of the most preferred processes is described below. A magnesium alloy part subjected to pretreatment is again immersed for 15 to 60 sec in an aqueous solution of citric acid hydrate with a concentration of 0.1 to 0.5% at a temperature of about 40° C., the alloy part is finely etched, and then washed with ion-exchange water. An aqueous solution containing potassium permanganate 1 to 5%, acetic acid 0.5 to 2%, and sodium acetate hydrate 0.1 to 1.0% is then prepared at 40 to 60° C. as a conversion treatment liquid, and the magnesium alloy part is immersed therein for 0.5 to 2 min, washed with water, placed for 5 to 20 min in a warm air drier at 60 to 90° C. and dried. A magnesium alloy part of brownish red color covered with a thin layer of manganese oxide is obtained.

On the other hand, an example of a method that is preferred for implementing the present invention by a chromate treatment method that is generally considered as the best method in terms of providing corrosion resistance will be described below. A base material of a magnesium alloy subjected to pretreatment is again immersed for 15 to 60 sec in an aqueous solution of citric acid hydrate with a concentration of 0.1 to 0.5% at a temperature of about 40° C., the base material is finely etched, and then washed with ion-exchange water. An aqueous solution containing anhydrous chromic acid (chromium trioxide) 15 to 20% is then prepared at 60 to 80° C. as a conversion treatment liquid, and the magnesium alloy part subjected to fine etching is immersed therein for 2 to 4 min, and washed with water. It is then placed for 5 to 20 min in a warm air drier at 60 to 90° C. and dried. The surface layer is subjected to chromate treatment and a magnesium alloy base material of gray color is obtained.

[Resin Layer]

The resin layer in accordance with the present invention is a resin containing PBT or PPS, which is a thermoplastic resin having crystallinity, as the main component. Polyamides are also highly crystalline resins and are not the resins that cannot be used in accordance with the present invention. However, because they have a somewhat low mechanical strength and can absorb water, they presently cannot provide sufficient reliability in terms of maintaining a fixing force for a long time and are not used in accordance with the present invention. However, they can be used for certain applications. The resin layer as referred to in the description of the present invention is a portion obtained by injection molding and although it is described by term "layer", it represents a shaped object having a certain thickness rather than indicating a thin object.

If necessary, fillers and modifiers such as polymers, glass fibers, and carbon fibers other than PBT or PPS may be admixed to the resin layer in accordance with the present invention in order to improve various mechanical properties. A variety of PBT synthesized for injection molding can be used as a PBT base resin. On the other hand, the PPS base resin may have a linear chain structure, or a branched structure may be introduced thereinto, or it may be subjected to heating in an inactive gas. The resin having a branched structure introduced thereinto or a resin subjected to heating in an inactive gas is preferred.

[Resin Layer (Composition of PPS and Polyolefin)]

The resin layer in accordance with the present invention mainly contains PBT or PPS. However, in the case of PPS, the fixing strength can be further increased by adding an adequate amount of a polyolefin resin. The reason therefor is supposedly that the crystallization rate during rapid cooling is reduced by the addition of an adequate amount of the polyolefin resin. As a result, the resin crystallizes and solidifies after it has penetrated sufficiently into the concavities formed on the conversion treatment surface, and the flow of molten resin prior to solidification corresponds to a certain degree of nanolevel roughness on the surface of concavities. The resultant effect is that the slip is prevented and the resin is locked, thereby increasing the fixing strength.

The resin composition composed of PPS having a polyolefin resin added thereto that is used in accordance with the present invention is preferably composed of a resin fraction composition containing 70 to 97 wt. % PPS and 3 to 30 wt. % polyolefin resin. In order to obtain a composite with excellent fixing ability, it is even more preferred that a resin fraction composition be obtained that contains 80 to 97 wt. % PPS and 3 to 20 wt. % polyolefin resin. Where the amount of PPS is less than 65 wt. % or higher than 97 wt. %, the composite obtained has poor fixing force of the base material and resin layer.

The PPS may be any from the class called PPS. Among such resins, those with a melt viscosity of 100-30,000 poise are preferred because excellent molding processability can be attained when the resin composition is obtained. The melt viscosity is a value obtained by measuring with a high-performance flow tester equipped with a die with a diameter of 1 mm and a length of 2 mm at a measurement temperature of 315° C. and load of 10 kg. Further, the PPS may be substituted with amino groups or carboxyl groups, or may be copolymerized with trichlorobenzene or the like during polymerization.

A resin having a linear chain structure, or a branched structure introduced thereinto, or a resin that is subjected to heating in an inactive gas may be used as PPS. Further, the PPS may be subjected to a deionizing treatment (acid washing, hot water washing, or the like) before or after heating and curing, or the amount of impurities such as ions and oligomers may be reduced by performing washing treatment with an organic solvent such as acetone. Furthermore, curing may be advanced by performing heating in an oxidizing gas after the polymerization reaction is completed.

Usually, well-known commercial ethylene resins and propylene resins may be used as the polyolefin resins. Among them, from the standpoint of obtaining a composite with excellent adhesive properties, copolymers of maleic anhydride and modified ethylene, copolymers of glycidyl methacrylate and modified ethylene, copolymers of glycidyl ether and modified ethylene, and copolymers of ethylene and alkyl acrylate are preferred.

Examples of copolymers of maleic anhydride and modified ethylene include a polymer of maleic anhydride and graft-modified ethylene, a copolymer of maleic anhydride and ethylene, and a terpolymer of ethylene, acrylic acid ester, and maleic anhydride. Among them, from the standpoint of obtaining an excellent composite, the terpolymer of ethylene, acrylic acid ester, and maleic anhydride is preferred. "Bondine (product name)" (manufactured by Alchema Co., Kyoto, Kyoto Prefecture, Japan) is a specific example of such terpolymer of ethylene, acrylic acid ester, and maleic anhydride.

Examples of copolymers of glycidyl methacrylate and modified ethylene include copolymers of glycidyl methacrylate and graft modified ethylene and copolymers of glycidyl methacrylate and ethylene. Among them, from the standpoint of obtaining an excellent composite, copolymers of glycidyl methacrylate and ethylene are preferred. "Bondfast (product name)" (manufactured by Sumitomo Chemical Co., Ltd., Chuo-ku, Tokyo, Japan) is an example of the copolymer of glycidyl methacrylate and ethylene.

Examples of copolymers of glycidyl ether and modified ethylene include copolymers of glycidyl ether and graft modified ethylene and copolymers of glycidyl ether and ethylene. "Lotryl (product name)" (manufactured by Alchema Co., Kyoto, Kyoto Prefecture, Japan) is an example of an ethylene-alkyl acrylate copolymer. In order to obtain an even better bonding between the base material and resin layer in the composite in accordance with the present invention, it is preferred that in the resin composition, 0.1 to 6 part by weight of a polyfunctional isocyanate compound and/or 1 to 25 parts by weight of an epoxy resin be compounded with a total of 100 parts by weight of a resin fraction including PPS 70 to 97 wt. % and a polyolefin resin 3 to 30 wt. %.

Commercial non-block and block compounds can be used as the polyfunctional isocyanate compounds. Examples of polyfunctional isocyanate compounds include 4,4'-diphenylmethane diisocyanate, 4,4'-diphenylpropane diisocyanate, toluene diisocyanate, phenylene diisocyanate, and bis(4-isocyanate phenyl)sulfone. Further, polyfunctional block isocyanate compounds can be compounds that have two or more isocyanate groups in a molecule and these groups are made to be inactive at room temperature by reacting them with a volatile active hydrogen compound, and the type of polyfunctional block isocyanate compounds is not particularly limited. Typically they have a structure in which the isocyanate group is masked by a blocking agents such as an alcohol, a phenol, ε-caprolactam, an oxime, an active methylene compound. "Takenate (product name)" (manufactured by Mitsui Chemical Polyurethane Co., Ltd., Tokyo, Japan) is an example of the polyfunctional block isocyanate.

Epoxy resins generally known as bisphenol A type resins and cresol-novolak type resins can be used as the epoxy resins. "Epicoat (product name)" (manufactured by Japan Epoxy Resin Co., Ltd., Tokyo, Japan) is an example of a bisphenol A type epoxy resin, and "Epiclon (product name)" (manufactured By Dainippon Ink and Chemicals Co., Ltd., Tokyo, Japan) is an example of a cresol-novolak type epoxy resin.

[Resin Layer (Composition Obtain by Mixing PBT and PET)]

The resin fraction of the resin layer in accordance with the present invention may be a composition obtained by mixing PBT and polyethylene terephthalate (PET). The appropriate mixing ratio is PBT 5 to 100 wt. % and PET 0 to 35 wt. %.

[Filler]

In the resin used for the resin layer in accordance with the present invention, a polybutylene terephthalate resin or a polyphenylene sulfide resin, which is a thermoplastic resin having crystallinity, is used as the main polymer, but a filler may be mixed with these polymers to improve mechanical properties thereof. The mixing ratio of the filler may be 1 to 200 parts by weight of the filler per 100 parts by weight of the entire resin fraction of the polyphenylene sulfide resin and polyolefin resin, or per 100 parts by weight of the entire resin comprising the polybutylene terephthalate resin and polyethylene terephthalate resin. A fibrous filler, a powdered filler, and a plate-like filler can be used as the filler. Examples of fibrous fillers include glass fibers, carbon fibers and aramide fibers. Specific examples of glass fibers include chopped strands with an average fiber diameter of 6 to 14 μm. Examples of plate-like and powdered fillers include calcium carbonate, mica, glass flakes, glass balloons, magnesium carbonate, silica, talc, clay, and ground carbon fibers or aramide fibers. The filler is preferably treated with a silane coupling agent or a titanate coupling agent.

[Method for Manufacturing the Composite]

The composite in accordance with the present invention is preferably manufactured by an injection joining method, that is, by a method by which a base material composed of a magnesium alloy is inserted into an injection molding mold, the mold is closed, and a resin is injected. The preferred manufacture example is described below. Thus, a composite is manufactured by preparing an injection molding mold, opening the mold, inserting a base material composed of a conversion treated magnesium alloy that has been obtained by the above-described treatment to one side of the mold, closing the mold, injecting a thermoplastic resin composition having PBT or PPS as a resin fraction, solidifying the resin, and opening the mold.

The injection conditions are described below. The mold temperature produces little effect on the resin strength of the solidified resin, and from the standpoint of excelling in production efficiency of composites, it is preferred that the mold temperature be equal to or higher than 100° C., and more preferably equal to or higher than 120° C. On the other hand, the injection temperature, injection pressure, and injection rate are not different from the usual injection molding conditions, but to stretch a point, the higher injection rate and injection pressure are preferred.

As described hereinabove in details, in the composite in accordance with the present invention, a resin composition part and a base material composed of a magnesium alloy are integrated so that they cannot be easily peeled off from each other. In such composite, a metal oxide, a metal carbonate, or a metal phosphate is formed on the surface layer of the base material. Therefore, the composite excels in corrosion resistance. Further, by molding a thermoplastic resin composition containing PBT or PPS as the main component by injection molding, it is possible to produce composites composed of a base material containing a magnesium alloy and a resin layer with high mass production ability and productivity.

Figure 1:
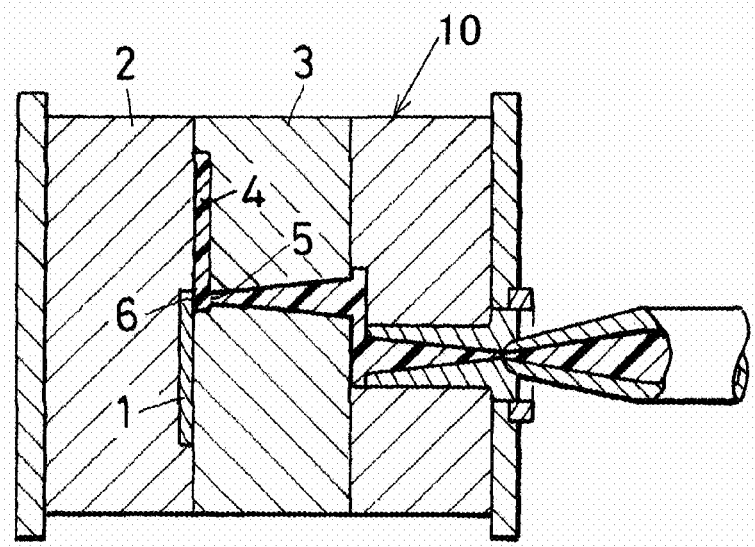
FIG. 1 is a structural drawing of an injection molding mold that illustrates schematically the process of manufacturing a composite of a magnesium alloy piece and a resin composition.

EXPLANATION OF KEYS 1 magnesium alloy plate
2 movable mold plate
3 fixed mold plate
4 resin composition
5 ping point gate
6 joining surface
7 composite

BEST MODE FOR CARRYING OUT THE INVENTION

Figure 2:
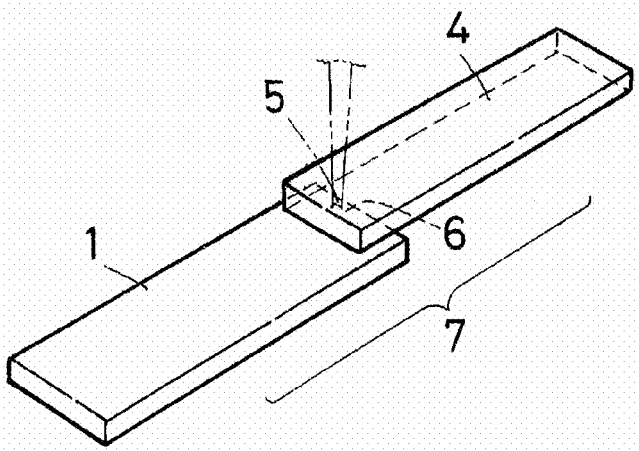
FIG. 2 is an external appearance drawing of a schematically illustrated single unit of a composite of a magnesium alloy piece and a resin composition.

Embodiments of the present invention are explained below based on examples thereof. FIG. 1 and FIG. 2 are used as the drawings shared by the examples. FIG. 1 is a structural diagram of a mold that illustrates schematically an injection molding mold composed of a movable mold plate and a fixed mold plate. FIG. 2 shows an external appearance of a composite 7 in which a base material 1 and a resin composition 4 are fixed integrally by using the injection molding mold.

The magnesium alloy plate 1 processed to a predetermined shape is inserted between the movable mold plate 2 and fixed mold plate 3 of a metallic mold 10 for injection molding, and the molten resin composition 4 is injected from the nozzle and poured into the mold cavity via a pin gate 5. The resin composition 4 is fixed to a joining surface 6 having fine concavities formed on the surface of the magnesium alloy plate 1, and a composite 7 in which the two are integrated is manufactured. In the below-described examples, in order to measure the fixing strength of the composites 7 manufactured in the examples, a tension is applied to the magnesium alloy plate 1 and resin composition 4, the joining surface 6 thereof is loaded with a shear stress, and the rupture strength thereof is measured to check the fixing force.

EXAMPLES

Examples of the present invention will be described below in greater detail. First, evaluation and measurement methods and measurement equipment used for evaluating and measuring composites obtained in the below-described examples will be described.

[Evaluation and Measurement Methods and Measurement Equipment]

(a) Melt Viscosity Measurement of Resin

A high-performance flow tester well known as means for measuring melt viscosity and fluid characteristics of various thermoplastic and thermosetting plastics was used to measure the melt viscosity of resins. The melt viscosity was measured at a measurement temperature of 315° C. and under a load of 0.98 Mpa (10 kgf) with a high-performance flow tester "CFT-500 (product name)" (manufactured by Shimazu Corp., Kyoto prefecture, Japan) equipped with a die with a diameter of 1 mm and a length of 2 mm (b) X-Ray Photoelectron Analyzer (XPS Observations)

As one surface observation method, observation was conducted with a photoelectron analyzer (XPS observations) by which the energy of photoelectrons emitted from a sample when the sample was irradiated with X rays was analyzed and qualitative analysis of elements was performed. An "Axis-Nova (product name)" (manufactured by Kratos Analytical Co., Ltd. (England)/Shimazu Corp.) of a system in which a surface with a diameter of several micrometers is observed within a depth range up to several nanometers was used as the photoelectron analyzer.

(c) Electron Microscope Observations

An electron microscope was used mainly for observing the base material surface. A scanning (SEM) electron microscope "5-4800 (product name)" (manufactured by Hitachi, Ltd., Tokyo, Japan) and "JSM-6700F (product name)" (manufactured by Hitachi Denshi KK, Tokyo, Japan) were used as the electron microscopes. The observations were performed at 1 to 2 KV.

(d) Scanning Probe Microscope Observations

The aforementioned microscope was mainly used for observing the base material surface. The scanning probe microscope uses a probe with a protruding distal end and the surface stage is enlarged and observed by moving the probe so as to trace the material surface. "SPM-9600 (product name)" (manufactured by Shimazu Corp., Kyoto prefecture, Japan) was used as the scanning probe microscope.

(e) Measurement of Joining Strength of Composites

As for the tensile stress, the composite 7 was stretched, a shear force was applied, and a shear force at the time of rupture was taken as a shear stress. "Model 1323 (product name)" (manufactured by Aiko Engineering KK, Tokyo, Japan) was used as the tensile test machine, and the shear force was measured at a tension rate of 10 mm/min (f) Salt Water Spraying Test A salt water spraying test was performed to test the composite in accordance with the present invention for corrosion resistance. A salt water spraying test machine "SPT-90" (manufactured by Suga Shikenki KK, Tokyo, Japan) that is a material testing device for testing a material for corrosion resistance and deterioration by spraying salt water was used to perform the test.

Preparation Example 1 of PPS Composition

The PPS Preparation Example 1 represents a preparation example in which PPS and a polyolefin resin were mixed. A total of 6,214 g of $Na_2S.2.9H_2O$ and 17,000 g of N-methyl-2-pyrrolidone were charged into an autoclave having a capacity of 50 L and equipped with a stirrer, and the temperature was gradually raised to 205° C., while stirring under a nitrogen flow, to distill off 1355 g of water. The system was cooled to 140° C., then 7160 g of p-dichlorobenzene and 5000 g of N-methyl-2-pyrrolidone were added and the system was sealed under a nitrogen flow. The temperature of the system was raised to 225° C. within 2 h, and the system was polymerized for 2 h at 225° C. Then, the temperature was raised to 250° C. within 30 min and the polymerization was further continued for 3 h at 250° C.

Upon completion of polymerization, the polymer cooled to room temperature was isolated with a centrifugal separation machine. The solid fraction of the polymer was repeatedly washed with warm water and dried overnight at 100° C. to obtain PPS (referred to hereinbelow as PPS (1)) with a melt viscosity of 280 poise. The PPS (1) was further cured for 3 h at 250° C. under a nitrogen atmosphere to obtain PPS (referred to hereinbelow as PPS (2)). The PPS (2) thus obtained had a melt viscosity of 400 poise.

A total of 6.0 kg of the PPS (2) obtained, 1.5 kg of a terpolymer of ethylene, acrylic acid ester, and maleic anhydride "Bondine TX8030 (product name)" (manufactured by Alchema Co., Kyoto, Kyoto Prefecture, Japan), and 0.5 kg of epoxy resin "Epicoat 1004 (product name)" (manufactured by Japan Epoxy Resin Co., Ltd., Tokyo, Japan) were premixed homogeneously in a tumbler. Then, the mixture was melt kneaded at a cylinder temperature of 300° C. in a twin-screw extruder "TEM-35B (product name)" (manufactured by Toshiba Kiki KK, Shizuoka Prefecture, Japan), while supplying glass fibers "RES03-TP91 (product name)" (manufactured by Nippon Sheet Glass Co., Ltd., Tokyo, Japan) having an average fiber diameter of 9 μm and a fiber length of 3 mm from a side feeder so as to obtain a total added amount of 20 wt. %, thereby producing a pelletized PPS composition (1). The PPS composition (1) is a resin composition in which the polyolefin resin takes 20% of the entire resin fraction, and the epoxy resin fraction takes 7 parts, the entire resin fraction being 100 parts. The PPS composition (1) thus obtained was dried for 5 h at 175° C.

Preparation Example 2 of PPS Composition

The PPS composition (1) obtained in the Preparation Example 1 of a PPS composition was cured for 3 h at a temperature of 250° C. under an oxygen atmosphere to obtain PPS (referred to hereinbelow as PPS (3)). The melt viscosity of the PPS (3) thus obtained was 1800 poise. A total of 5.98 kg of the PPS (3) obtained and 0.02 kg of polyethylene "Nipolon Hard 8300A (product name)" (manufactured by Tosoh Corp., Tokyo, Japan) were premixed homogeneously in a tumbler. Then, the mixture was melt kneaded at a cylinder temperature of 300° C. in the twin-screw extruder "TEM-35B" (above-mentioned), while supplying glass fibers "RES03-TP91" having an average fiber diameter of 9 μm and a fiber length of 3 mm from a side feeder so as to obtain a total added amount of 40 wt. %, thereby producing a pelletized PPS composition (2). This composition is a resin composition in which the polyolefin resin takes 0.3% of the entire resin fraction. The PPS composition (2) thus obtained was dried for 5 h at 175° C.

Preparation Example 3 of PPS Composition

A total of 7.2 kg of the PPS composition (2) obtained in the Preparation Example 1 of a PPS composition and 0.8 kg of glycidyl methacrylate-ethylene copolymer "Bondfast E" (manufactured by Sumitomo Chemical Co., Ltd.) were premixed homogeneously in a tumbler. Then, the mixture was melt kneaded at a cylinder temperature of 300° C. in the twin-screw extruder "TEM-35B" (above-mentioned), while supplying glass fibers "RES03-TP91" having an average fiber diameter of 9 μm and a fiber length of 3 mm from a side feeder so as to obtain a total added amount of 20 wt. %, thereby producing a pelletized PPS composition (3). This composition is a resin composition in which the polyolefin resin takes 10% of the entire resin fraction. The PPS composition (3) thus obtained was dried for 5 h at 175° C.

Preparation Example 4 of PPS Composition

A total of 4.0 kg of PPS (2) obtained in the Preparation Example 1 of a PPS composition and 4.0 kg of a terpolymer of ethylene, acrylic acid ester, and maleic anhydride "Bondine TX8030 (product name)" (manufactured by Alchema Co., Kyoto, Kyoto Prefecture, Japan), were premixed homogeneously in a tumbler. Then, the mixture was melt kneaded at a cylinder temperature of 300° C. in the twin-screw extruder "TEM-35B" (above-mentioned), while supplying glass fibers "RES03-TP91" having an average fiber diameter of 9 μm and a fiber length of 3 mm from a side feeder so as to obtain a total added amount of 20 wt. %, thereby producing a pelletized PPS composition (4). This composition is a resin composition in which the polyolefin resin takes 50% of the entire resin fraction. The PPS composition (4) thus obtained was dried for 5 h at 175° C.

Preparation Example 5 of PBT Composition

A PBT composition (1) containing PBT 47% and glass fibers 38% was obtained by kneading a commercial PBT resin (Toraycon 1101G45 (manufactured by Toray Industries, Inc., Tokyo, Japan) and a PBT resin in use of the twin-screw extruder "TEM-35B". The PBT composition (1) is a resin composition in which PET takes 24% of the entire resin fraction. The composition thus obtained was dried for 5 h at 130° C.

Example 1

AZ31B magnesium alloy (manufactured by Nippon Kinzoku Kogyo KK, Tokyo, Japan) with a thickness of 0 8 mm and an average metal crystal size on the surface of 7 μm that was subjected to wet buffing as a final surface processing was used. The magnesium alloy sheet was cut to a rectangular shape with dimensions of 18 mm×45 mm (thickness 0.8 mm) to obtain magnesium alloy sheets 1. A through hole was provided in the end portion of the magnesium alloy sheets 1, a copper wire coated with vinyl chloride was passed through ten sheets, the copper wire was bent so that multiple magnesium alloy sheets 1 were not stacked, and all the sheets were hung down at the same time.

A commercial degreasing agent "Cleaner 160 (product name)" (manufactured by Marutekkusu KK, Tokyo, Japan) for magnesium alloys was poured into water in a degreasing tank to obtain an aqueous solution with a concentration of 10% at 75° C. The alloy pieces were immersed therein for 5 min and washed thoroughly with water. Then, a 2% aqueous solution of acetic acid with a temperature of 40° C. was prepared in a separate tank and the alloy pieces were immersed therein for 2 min and washed thoroughly with water. Black smut adhered thereto. A 7.5% aqueous solution of a degreasing agent "NE-6 (product name)" (manufactured Marutekkusu KK, Tokyo, Japan) for aluminum alloys at a temperature of 75° C. was prepared in a separate tank and the magnesium alloy pieces were immersed therein for 5 min and washed thoroughly with water. It was seen that the aluminum fraction of the smut was dissolved by the weak basicity of the liquid. Then, a 20% aqueous solution of caustic soda at 75° C. was prepared in another tank and the aforementioned alloy pieces were immersed therein for 5 min and washed thoroughly with water. It can be assumed that the zinc fraction of the smut was dissolved thereby. A 2% aqueous solution of nitric acid with a temperature of 40° C. was then prepared in a separate tank, and the magnesium alloy pieces were immersed therein for 1.5 min and washed thoroughly with water.

Then, a non-chromate conversion treatment liquid of a manganese phosphate system at 45° C. was prepared in a separate tank. Thus, an aqueous solution containing 2.5% manganese diphosphite, 2.5% phosphoric acid with a concentration of 85%, and 2% triethylamine was prepared, the magnesium alloy pieces were immersed therein for 5 min, washed thoroughly with water, placed for 10 min in a warm air drier at 60° C., and dried. Upon completion of drying, the copper wire was pulled out from the magnesium alloy sheets on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

Figure 3:
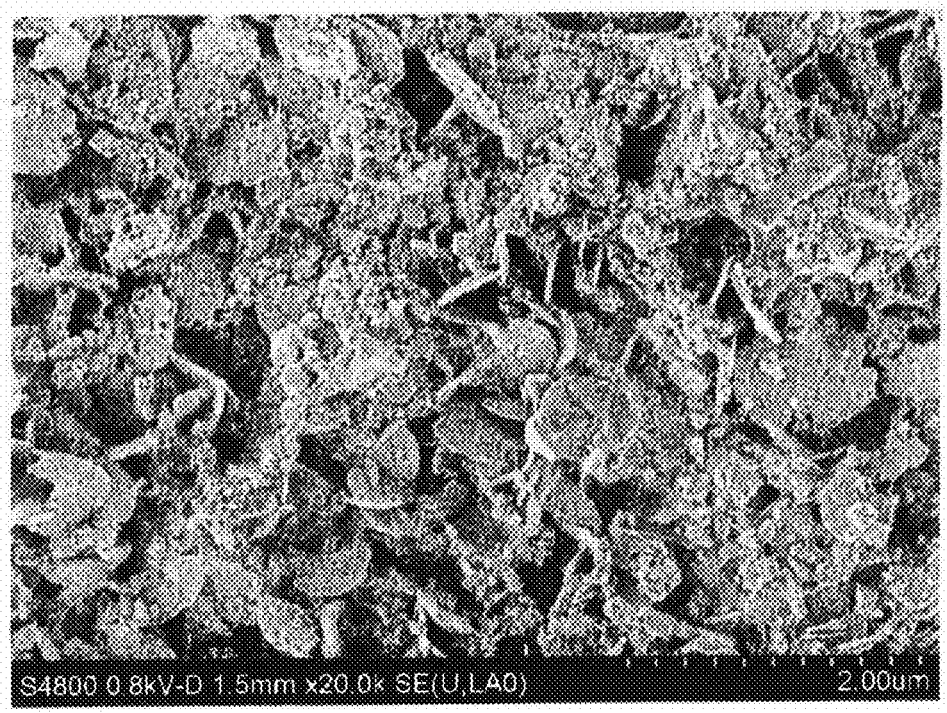
FIG. 3 is a surface photograph of an AZ31B magnesium alloy with an average grain size of metal crystals of 7 μm or less that is obtained by using an aqueous solution of acetic acid as a rough etching agent, using dilute nitric acid as a fine etching agent, and performing conversion treatment of a manganese phosphate system.

In 2 days, one piece was observed under an electron microscope. A large number of plate-like crystals were seen on the surface, in other portions, amorphous mater was seen. The length of cavities produced by the plate-like crystals was 400 to 600 nm, and the depth thereof was 500 nm or more. The number of the plate-like crystals that could be observed in a square with a side of 1 μm was 1 to 5, the specific number depending on the location. The surface image is shown on an electron micrograph (see FIG. 3). the remaining magnesium alloy sheets 1 were removed in 1 day, the side with the through hole therein was grasped with a gloved hand to prevent the adhesion of oils, and the sheets were inserted into an injection molding mold at 140° C. The mold was closed, a PBT resin composition "Toughpet G1030 (product name)" (manufactured by Mitsubishi Rayon Co., Ltd.) containing 30% glass fibers was injected at an injection temperature of 260° C. The mold temperature was 140° C., and a total of 20 integrated composites shown in FIG. 2 were obtained. The resin portion had the dimensions of 10 mm×45 mm×5 mm, and the joint surface 6 had the dimensions of 10 mm×5 mm and a surface area of 0.5 cm$^2$.

Four composites were subjected to a tensile rupture test on the molding day, and the average shear force was 11.8 MPa. Further, five composites were placed for 1 h into a hot air drier at a temperature of 150° C. on the molding day and annealed, followed by a tensile test conducted one day after. The average shear rupture stress was 11.9 MPa. The remaining 10 integrated products were coated with a paint "Omac-Silver Metallic (product name)" (manufactured by Ohashi Chemical Industries Co., Ltd., Osaka, Japan) to a set thickness of 10 μm and baked for 30 min at a temperature of 170° C. Salt water spraying was then conducted for 8 h at normal temperature by using 1% salt water, followed by washing with water and drying. No abnormalities in external appearance were observed.

Example 2

An AZ31B alloy sheet with a thickness of 0.8 mm that had an average metal crystal grain size of 7 μm was procured. The sheet was cut in the same manner as in Example 1 to obtain rectangular pieces that were immersed for 5 min in an aqueous solution of the degreasing agent "Cleaner 160" with a concentration of 10% at 75° C. and washed thoroughly with water. A 2% aqueous solution of acetic acid at 40° C. was then prepared in a separate tank, and the aforementioned magnesium alloy sheets 1 were immersed therein for 2 min and washed thoroughly with water. Black smut adhered thereto. A 7.5% aqueous solution of a degreasing agent "NE-6 (product name)" (manufactured Marutekkusu KK, Tokyo, Japan) for aluminum alloys at a temperature of 75° C. was prepared in a separate tank and the magnesium alloy pieces were immersed therein for 5 min and washed thoroughly with water. Then, a 20% aqueous solution of caustic soda at 75° C. was prepared in another tank and the group of magnesium alloy sheets 1 were immersed therein for 5 min and washed thoroughly with water. The above-described treatment was pretreatment, and the treatment method was identical to that of Example 1.

Then, the pieces were immersed for 15 sec in an aqueous solution of citric acid with a concentration of 0.5% at a temperature of 40° C. that was prepared in a separate tank and were washed with water. An aqueous solution containing 3% potassium permanganate, 1% acetic acid, and 0.5% sodium acetate at 45° C. was then prepared, and the pieces were immersed therein for 1 min, followed by thorough washing with water. The pieces were colored brown and were apparently covered with manganese dioxide. The pieces were then introduced for 10 min into a warm air drier at 60° C. and dried. The copper wire was pulled out from the magnesium alloy sheets 1 on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

Figure 4:
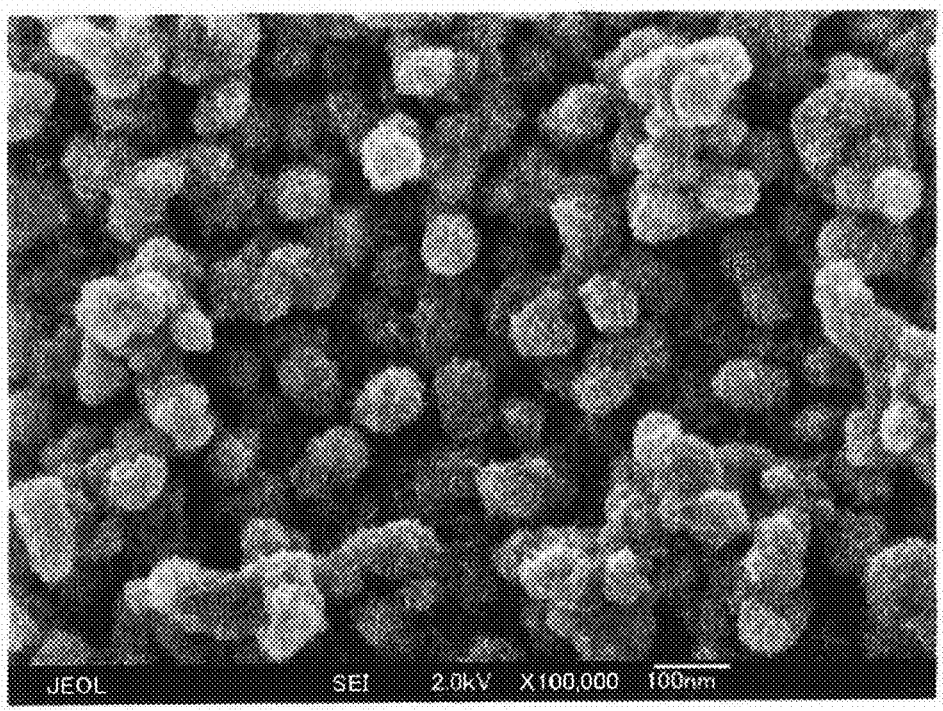
FIG. 4 is a surface photograph of an AZ31B magnesium alloy with an average grain size of metal crystals of 7 μm or less that is obtained by using an aqueous solution of acetic acid as a rough etching agent, using citric acid as a fine etching agent, and performing conversion treatment of a potassium permanganate system.

In 2 days, one piece was observed under an electron microscope. Spherical formations with a diameter of 80 to 120 nm that were produced by fine needle crystals were assembled, and these formations aggregated and joined together, producing periodic concavities and convexities. The period of 0.5 to 1 μm and the depth of concavities was 0.3 to 1 μm. The number of spherical formations per one square with a side of 1 μm was 90 to 120. The micrograph is shown in FIG. 4. The remaining magnesium alloy sheets 1 were removed in 1 day, the side with the through hole therein was grasped with a gloved hand to prevent the adhesion of oils, and the sheets were inserted into an injection molding mold at 140° C. A total of 10 integrated composites shown in FIG. 2 were obtained in the same manner as in Example 1. The composites were placed for 1 h into a hot air drier at a temperature of 150° C. on the molding day and annealed, followed by a tensile test conducted one day after. The average shear force was 11.6 MPa.

Example 3

An AZ31 alloy sheet with a thickness of 0.8 mm that had an average metal crystal grain size of 7 μm was procured. The sheet was cut in the same manner as in Example 1 to obtain rectangular pieces that were immersed for 5 min in an aqueous solution of the degreasing agent "Cleaner 160" with a concentration of 10% at 75° C. and washed thoroughly with water. A 2% aqueous solution of acetic acid at 40° C. was then prepared in a separate tank, and the aforementioned magnesium alloy sheets 1 were immersed therein for 2 min and washed thoroughly with water. Black smut adhered thereto. A 7.5% aqueous solution of a degreasing agent "NE-6 (product name)" for aluminum alloys at a temperature of 75° C. was prepared in a separate tank and the magnesium alloy pieces were immersed therein for 5 min and washed thoroughly with water. Then, a 20% aqueous solution of caustic soda at 75° C. was prepared in another tank and the group of magnesium alloy sheets 1 were immersed therein for 5 min and washed thoroughly with water. The above-described treatment was pretreatment, and the treatment method was identical to that of Example 1.

Then, the pieces were immersed for 15 sec in an aqueous solution of citric acid with a concentration of 0.5% at a temperature of 40° C. that was prepared in a separate tank and were washed with water. The pieces were then immersed for 2 min in an aqueous solution containing 0.12% zircon acetyl acetonate and 0.05% aqueous solution of fluorotitanic acid with a concentration of 40% at 60° C. The pieces were then placed for 10 min in a warm air drier at 60° C. and dried. The copper wire was pulled out from the magnesium alloy sheets 1 on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

Further, the remaining magnesium alloy sheets 1 were removed in 1 day, the side with the through hole therein was grasped with a gloved hand to prevent the adhesion of oils, and the sheets were inserted into an injection molding mold at 140° C. A total of 10 integrated composites shown in FIG. 2 were obtained in the same manner as in Example 1. The composites were placed for 1 h on the molding day into a hot air drier at a temperature of 150° C. and annealed, followed by a tensile test conducted one day after. The average shear force was 7.7 MPa (78 Kgf/cm$^2$).

Example 4

An AZ31 alloy sheet with a thickness of 0.8 mm that had an average metal crystal grain size of 7 μm was procured. The sheet was cut in the same manner as in Example 1 to obtain rectangular pieces that were immersed for 5 min in an aqueous solution of the degreasing agent "Cleaner 160" with a concentration of 10% at 75° C. and washed thoroughly with water. A 2% aqueous solution of acetic acid at 40° C. was then prepared in a separate tank, and the aforementioned magnesium alloy sheets 1 were immersed therein for 2 min and washed thoroughly with water. Black smut adhered thereto. A 7.5% aqueous solution of a degreasing agent "NE-6 (product name)" for aluminum alloys at a temperature of 75° C. was prepared in a separate tank and the magnesium alloy pieces were immersed therein for 5 min and washed thoroughly with water. Then, a 20% aqueous solution of caustic soda at 75° C. was prepared in another tank and the group of magnesium alloy sheets 1 were immersed therein for 5 min and washed thoroughly with water. The above-described treatment was pretreatment, and the treatment method was identical to that of Example 1.

Then, the pieces were immersed for 15 sec in an aqueous solution of citric acid with a concentration of 0.5% at a temperature of 40° C. that was prepared in a separate tank and were washed with water. The pieces were then immersed for 5 sec in an aqueous solution containing 2% zinc acetyl acetonate, 1% aqueous solution of titanium sulfate with a concentration of 24%, and 0.1% diammonium fluorozirconate at 70° C. and washed thoroughly with water. The pieces were then placed for 10 min in a warm air drier at 60° C. and dried. The copper wire was pulled out from the magnesium alloy sheets 1 on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

Further, the remaining magnesium alloy sheets 1 were removed in 1 day, the side with the through hole therein was grasped with a gloved hand to prevent the adhesion of oils, and the sheets were inserted into an injection molding mold at 140° C. A total of 10 integrated composites shown in FIG. 2 were obtained in the same manner as in Example 1. The composites were placed for 1 h into a hot air drier at a temperature of 150° C. on the molding day and annealed, followed by a tensile test conducted one day after. The average shear force was 6.9 MPa.

Example 5

An AZ31B alloy sheet with a thickness of 0.8 mm that had an average metal crystal grain size of 7 μm was procured. The sheet was cut in the same manner as in Example 1 to obtain rectangular pieces that were subjected to a pretreatment including the degreasing operation. The pretreatment method was identical to that of Examples 1 to 4. Then, the pieces were immersed for 30 sec in an aqueous solution of citric acid hydrate with a concentration of 0.25% at a temperature of 40° C. that was prepared in a separate tank and were washed with water. The magnesium pieces were then immersed for 5 min in an aqueous solution containing 20% chromic acid at 75° C. and washed thoroughly with water. The pieces were then placed for 10 min in a warm air drier at 60° C. and dried. The copper wire was pulled out from the magnesium alloy sheets 1 on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

In 1 day, one piece was subjected to ESCA observations. A large amount of chromium and oxygen were observed. The main component was observed as a composite with trivalent chromium oxide or chromium hydroxide. Further, the magnesium alloy pieces were removed in 1 day, the side with the through hole therein was grasped with a gloved hand to prevent the adhesion of oils, and the pieces were inserted into an injection molding mold at 140° C. A total of 20 integrated composites 7 shown in FIG. 2 were obtained in the same manner as in Example 1. The composites were directly placed for 1 h into a hot air drier at a temperature of 150° C. and annealed, followed by a tensile test conducted one day after. The average shear force was 6.6 MPa. The remaining 10 integrated products were coated with a paint "Omac-Silver Metallic (product name)" to a set thickness of 10 μm and baked for 30 min at a temperature of 170° C. Salt water spraying was then conducted for 8 h at 35° C. by using 5% salt water, followed by washing with water and drying. No abnormalities in external appearance were observed.

Example 6

An AZ31B magnesium alloy (manufactured by Nippon Kinzoku Kogyo KK, Tokyo, Japan) with a thickness of 0.8 mm and an average metal crystal size on the surface of 7 μm that was subjected to wet buffing as a final surface processing was cut to obtain rectangular pieces of the same shape as in Example 1 and the pieces were subjected to pretreatment including the degreasing operation. The pretreatment method was identical to that of Examples 1 to 5. Then, the pieces were immersed for 30 sec in an aqueous solution of citric acid hydrate with a concentration of 0.25% at a temperature of 40° C. that was prepared in a separate tank and were washed with water. The pieces were then immersed for 5 min in an aqueous solution containing 1% potassium carbonate at 70° C. and washed thoroughly with water. The pieces were then placed for 10 min in a warm air drier at 60° C. and dried. The copper wire was pulled out from the magnesium alloy pieces on a clean aluminum foil, and the sheets were wrapped in the foil, placed in a polyethylene bag, and sealed for storage. In this process, the surface to be joined (end portion on the side opposite that where the through holes were provided) was not touched with fingers or the like.

Figure 5:
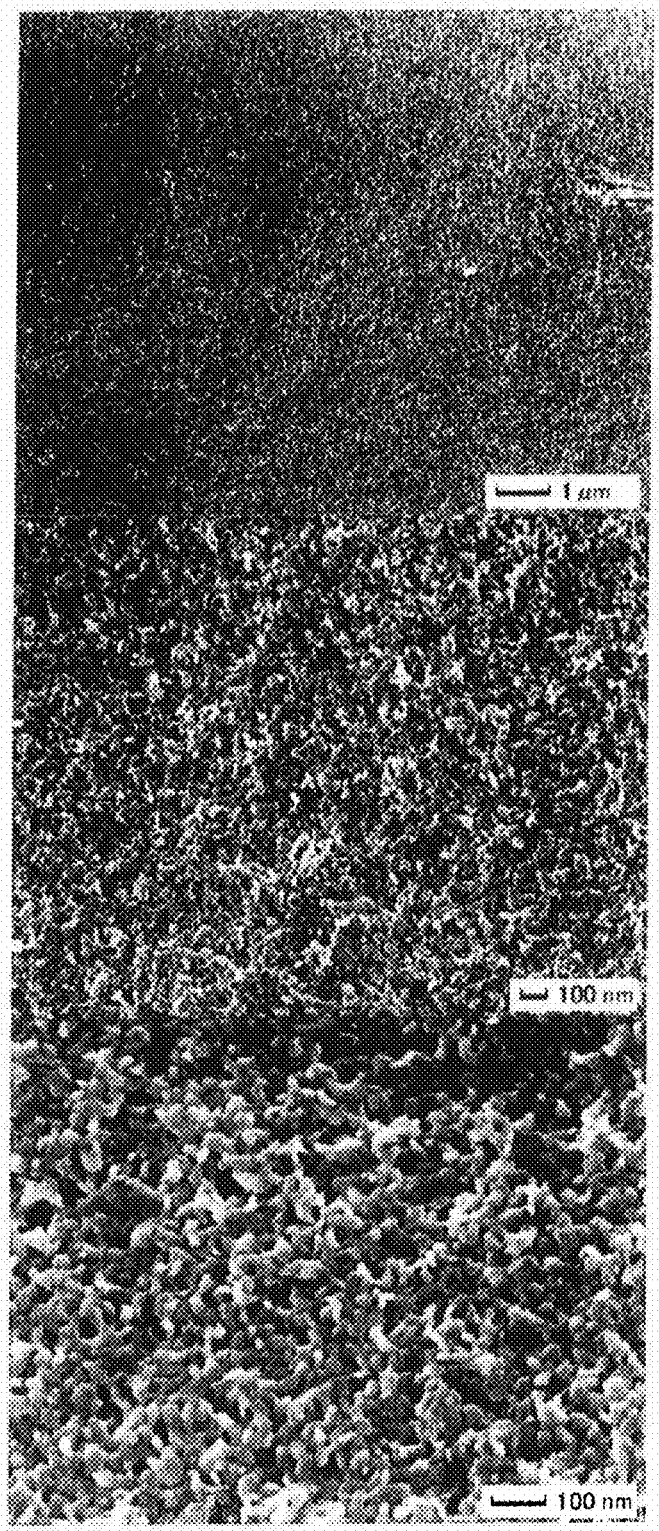
FIG. 5 is a surface photograph of an AZ31B magnesium alloy with an average grain size of metal crystals of 7 μm that is obtained by using an aqueous solution of acetic acid as a rough etching agent, using dilute nitric acid as a fine etching agent, and performing conversion treatment of a potassium carbonate system.

In 1 day, one piece was observed under an electron microscope. The results are shown in a micrograph in FIG. 5. A beautiful image in which intersecting rod-like crystals formed a net-like pattern was observed. On the other hand, the ESCA analysis revealed the presence of magnesium, oxygen, carbon and also microscopic amounts of aluminum, zinc, and silicon. Because the presence of carbon not in a microscopic amount was confirmed, it was supposed that magnesium carbonate is the main component of the surface layer. Further, the remaining magnesium alloy pieces were removed in 1 day, the side with the through hole therein was grasped with a gloved hand to prevent the adhesion of oils, and the pieces were inserted into an injection molding mold at 140° C. Injection molding was performed in the same manner as in Example 1 and a total of 20 integrated composites 7 shown in FIG. 2 were obtained. The composites were placed for 1 h into a hot air drier at a temperature of 150° C. and annealed, followed by a tensile test conducted one day after. The average shear force was 7.0 MPa.

Example 7

An AZ31B magnesium alloy (manufactured by Nippon Kinzoku KK) with a thickness of 0.8 mm and an average metal crystal size on the surface of 7 μm was used and the processing preceding pretreatment was performed in the same manner as in Example 1. Then, the pieces were immersed for 30 sec in an aqueous solution of citric acid with a concentration of 0.25% at a temperature of 40° C. that was prepared in a separate tank and were washed with water. The pieces were then immersed for 10 min in an aqueous solution containing 1% calcium nitrate hydrate, 1% strontium nitrate hydrate, 0.05% sodium chloride, and 0.95% phosphorus (80%) at 65° C. and washed thoroughly with water. The pieces were then placed for 10 min in a warm air drier at 60° C. and dried. The copper wire was pulled out from the magnesium alloy pieces on a clean aluminum foil, and the sheets were wrapped in the foil, placed in a polyethylene bag, and sealed for storage. In this process, the surface to be joined (end portion on the side opposite that where the through holes were provided) was not touched with fingers. In one day, one piece was subjected to ESCA.

Magnesium, calcium, strontium, and oxygen were observed in large amounts. In addition very small amounts of zinc, aluminum, carbon, and silicon were observed. Oxides of magnesium, calcium, and strontium were considered as the main components. The analytical device used could not clarify whether a single composition or multiple compositions were present. Further, the remaining magnesium alloy pieces were removed in 1 day, the side with the through hole therein was grasped with a gloved hand to prevent the adhesion of oils, and the sheets were inserted into an injection molding mold at 140° C. The injection molding was performed in the same manner as in Example 1 and a total of 20 integrated composites shown in FIG. 2 were obtained. The composites were placed for 1 h into a hot air drier at a temperature of 150° C. on the molding day and annealed, followed by a tensile test conducted one day after. The average shear force was 7.3 MPa.

Example 8

An AZ31B magnesium alloy with a thickness of 0.8 mm and an average metal crystal size on the surface of 7 μm was used and the processing preceding pretreatment was performed in the same manner as in Example 1. Then, the pieces were immersed for 30 sec in an aqueous solution of citric acid with a concentration of 0.25% at a temperature of 40° C. that was prepared in a separate tank and were washed with water. The pieces were then immersed for 2 min in an aqueous solution containing 1% vanadium trichloride at 45° C. and washed thoroughly with water. The pieces were then placed for 10 min in a warm air drier at 60° C. and dried. The copper wire was pulled out from the magnesium alloy pieces on a clean aluminum foil, and the sheets were wrapped in the foil, placed in a polyethylene bag, and sealed for storage. In this process, the surface to be joined (end portion on the side opposite that where the through holes were provided) was not touched with fingers. In one day, one piece was subjected to ESCA. Vanadium and oxygen were observed in large amounts. In addition, a small amount of magnesium and very small amounts of zinc, aluminum, and silicon were observed. Vanadium oxide or an oxide of vanadium and magnesium were considered as the main components.

Further, the remaining magnesium alloy pieces were removed in 1 day, the side with the through hole therein was grasped with a gloved hand to prevent the adhesion of oils, and the sheets were inserted into an injection molding mold at 140° C. The injection molding was performed in the same manner as in Example 1 and a total of 20 integrated composites 7 shown in FIG. 2 were obtained. The composites were placed for 1 h into a hot air drier at a temperature of 150° C. on the molding day and annealed, followed by a tensile test conducted one day after. The average shear force was 7.0 MPa. The remaining 10 integrated products were coated with a paint "Omac-Silver Metallic (product name)" to a set thickness of 10 μm and baked for 30 min at a temperature of 170° C. Salt water spraying was then conducted for 8 h at 35° C. by using 5% salt water, followed by washing with water and drying. No abnormalities in external appearance were observed.

Example 9

Example 9 was used to confirm the effect of the PPS resin. "Susteel GS-30 (product name)" (manufactured by Tosoh Corp., Tokyo, Japan), which is a PPS resin, containing 30% glass fibers was used as a resin for injection. the injection conditions during molding were as follows: injection temperature 310° C. and mold temperature 140° C. Conditions other than these injection molding conditions were identical to those of Example 1. On the molding day, four pieces were subjected to a tensile rupture test. The average shear force was 8.8 MPa (90 Kgf/cm$^2$). Further, on the molding day, five pieces were placed for 1 h in a hot air drier at 170° C. In one day, they were subjected to a tensile test. The average shear force was 9.3 MPa.

The remaining 10 integrated products were coated with a paint "Omac-Silver Metallic (product name)" to a set thickness of 10 μm and baked for 30 min at a temperature of 170° C. Salt water spraying was then conducted for 8 h by using 5% salt water, followed by washing with water and drying. No abnormalities in external appearance were observed.

Example 10

Example 10 was used to confirm the effect of the PPS resin. The magnesium alloy pieces were treated in substantially the same manner as in Example 9 and the injection joining was performed in exactly the same manner as in Example 9. As for the synthetic resin used, the PPS composition (1) obtained in the Preparation Example 1 of a PPS composition was used instead of the "Susteel GS-30" employed in Example 9. A total of 20 integrated composites 7 shown in FIG. 2 were obtained. The resin portion had a size of 10 mm×45 mm v 5 mm, and the joint surface 6 had a size of 10 mm×5 mm and an area of 0.5 cm$^2$.

On the molding day, four pieces were subjected to a tensile rupture test. The average shear force was 13.0 MPa. Further, on the molding day, five pieces were placed for 1 h in a hot air drier at 170° C. In one day, they were subjected to a tensile test. The average shear force was 12.8 MPa. The remaining 10 integrated products were coated with a paint "Omac-Silver Metallic (product name)" to a set thickness of 10 μm and baked for 30 min at a temperature of 170° C. Salt water spraying was then conducted for 8 h at 35° C. by using 5% salt water, followed by washing with water and drying. No abnormalities in external appearance were observed.

Example 11

Composites were obtained by exactly the same method as that of Example 10, except that the PPS composition (3) obtained in Preparation Example 3 was used instead of the PPS composition (1) obtained in Preparation Example 1 of a PPS composition. On the molding day, the composite was annealed for 1 h in at 170° C., and in two days, the shear force was measured in a tensile test machine. The average value was 12.5 MPa. The remaining 10 integrated products were coated with a paint "Omac-Silver Metallic (product name)" (manufactured by Ohashi Chemical Industries Co., Ltd., Osaka, Japan) to a set thickness of 10 μm and baked for 30 min at a temperature of 170° C. Salt water spraying was then conducted for 8 h at 35° C. by using 5% salt water, followed by washing with water and drying. No abnormalities in external appearance were observed.

Example 12

Magnesium alloy pieces were produced, injection molding was performed, and composites were obtained in exactly the same manner as in Example 10, except that the PPS composition (2) obtained in Preparation Example 2 was used instead of the PPS composition (1) obtained in Preparation Example 1. The composite obtained was annealed for 1 h in at 170° C. This was essentially the test in which a PPS resin composition containing only a filler and PPS containing but a tiny amount of polyolefin polymer was used. In one day, it was subjected to a tensile test. The average shear force for 10 pieces was 9.0 MPa. This value did not exceed about 70% the numerical value obtained in Example 1, thereby demonstrating the difference between the resin materials.

Example 13

An AZ31B alloy sheet with a thickness of 0.8 mm and an average metal crystal size on the surface of 7 μm was used. The sheet was cut to obtain rectangular pieces in the same manner as in Example 1. The pieces were immersed for 5 min in an aqueous solution of a degreasing agent "Cleaner 160" with a concentration of 10% at 75° C. and washed thoroughly with water. Then, a 2% aqueous solution of acetic acid with a temperature of 40° C. was prepared in a separate tank and the alloy pieces were immersed therein for 2 min and washed thoroughly with water. Black smut adhered thereto. A 7.5% aqueous solution of a degreasing agent "NE-6 (product name)" for aluminum alloys at a temperature of 75° C. was prepared in a separate tank and the magnesium alloy pieces were immersed therein for 5 min and washed thoroughly with water. Then, a 20% aqueous solution of caustic soda at 75° C. was prepared in another tank and the group of the aforementioned alloy pieces were immersed therein for 5 min and washed thoroughly with water. The treatment described was a pretreatment, and the treatment method was identical to that of Example 1.

The pieces were then immersed for 15 sec in an aqueous solution of citric acid hydrate with a concentration of 0.5% at a temperature of 40° C. that was prepared in a separate tank and were washed with water. An aqueous solution containing 3% potassium permanganate, 1% acetic acid, and 0.5% sodium acetate hydrate and having a temperature of 45° C. was then prepared, and the pieces were immersed therein for 1 min and then washed thoroughly with water. The pieces were colored brown. The pieces were then placed for 10 min in a in a warm air drier at 60° C. and dried. The copper wire was pulled out from the magnesium alloy pieces on a clean aluminum foil, and the sheets were wrapped in the foil, placed in a polyethylene bag, and sealed for storage. In this process, the surface to be joined (end portion on the side opposite that where the through holes were provided) was not touched with fingers.

In 2 days, one piece was subjected to ESCA observations. A large amount of manganese and oxygen were observed. In addition, very small amounts of magnesium, zinc, aluminum, carbon, and silicon were observed. Manganese oxide containing manganese dioxide as the main components was assumed to be a main component. This assumption was supported by a brown color tone. Further, the remaining magnesium alloy pieces were removed in 1 day, the side with the through hole therein was grasped with a gloved hand to prevent the adhesion of oils, and the pieces were inserted into an injection molding mold at 140° C. A total of 20 integrated composites 7 shown in FIG. 2 were obtained in exactly the same manner as in Example 1.

On the molding day, the composites were placed for 1 h into a hot air drier at a temperature of 170° C. and annealed, followed by a tensile test conducted one day after. The average shear force was 15.1 MPa. The remaining 10 integrated products were coated with a paint "Omac-Silver Metallic (product name)" to a set thickness of 10 μm and baked for 30 min at a temperature of 170° C. Salt water spraying was then conducted for 8 h at 35° C. by using 5% salt water, followed by washing with water and drying. No abnormalities in external appearance were observed.

Example 14

AZ31B alloy pieces were pretreated in exactly the same manner as in Example 13. The pieces were then immersed for 1 min in an aqueous solution of citric acid hydrate with a concentration of 0.25% at a temperature of 40° C. that was prepared in a separate tank and were washed with water. An aqueous solution containing 2% potassium permanganate, 1% acetic acid, and 0.5% sodium acetate hydrate and having a temperature of 45° C. was then prepared, and the pieces were immersed therein for 1 min and then washed thoroughly with water. The pieces were then placed for 15 min in a in a warm air drier at 60° C. and dried. The copper wire was pulled out from the magnesium alloy pieces on a clean aluminum foil, and the sheets were wrapped in the foil, placed in a polyethylene bag, and sealed for storage.

In 2 days, one piece of these was removed and inserted in an injection molding mold at 140° C., followed by the injection of PBT composition (1). The injection molding conditions were identical to those of Example 1. The integrated object shown in FIG. 2 was obtained. It was placed for 1 h into a hot air drier at a temperature of 150° C. and annealed, followed by a tensile test conducted one day after. The average shear force was 15.8 MPa.

The remaining 10 integrated products were coated with a paint "Omac-Silver Metallic (product name)" to a set thickness of 10 μm and baked for 30 min at a temperature of 170° C. Salt water spraying was then conducted for 8 h at 35° C. by using 1% salt water, followed by washing with water and drying. No abnormalities in external appearance were observed.

Comparative Example 1

Comparative Example 1 was used to confirm the effect of the conversion treatment of Example 1. Magnesium alloy sheets 1 were obtained in exactly the same manner as in Example 1, except that the conversion treatment was not performed. Thus, AZ31B magnesium alloy sheets 1 were produced, degreased, roughly etched, treated to remove smut, finely etched, and treated to remove smut. In fact, only the non-chromate treatment with a manganese phosphate system was not performed. In 2 days, the remaining magnesium alloy sheets 1 were removed, the side with the through hole therein was grasped with a gloved hand to prevent the adhesion of oils, and the sheets were inserted into an injection molding mold at 140° C.

The injection molding mold was closed and a PBT resin identical to that used in Example 1 was injected at an injection temperature of 260° C. The mold temperature was 140° C., and 14 integrated composites shown in FIG. 2 were obtained. The resin portion had a size of 10 mm×45 mm×5 mm, and the joint surface 6 had a size of 10 mm×5 mm and an area of 0.5 cm². On the molding day, the composites were annealed for 1 h at 150° C. and then four composites were subjected to a tensile rupture test. the average shear force was 7.4 MPa.

The remaining 10 integrated products were coated with a paint "Omac-Silver Metallic (product name)" to a set thickness of 10 μm and baked for 30 min at a temperature of 170° C. On the next day, the coated products were sprayed with salt water for 8 h at normal temperature by using 1% salt water, followed by washing with water and drying. Fine bulging of the coated film was observed over the entire integrated product. All ten composites were subjected to a tensile rupture test. The shear force had an average value of 4.9 MPa (50 Kgf/cm²). A brittle oxide film penetrated even onto the rupture surface, and when no conversion treatment was performed, the coating alone was confirmed to make the composite unsuitable for practical use.

Comparative Example 2

Magnesium alloy pieces were obtained in exactly the same manner as in Example 1, except that the conversion treatment was not performed. Thus, AZ31B magnesium alloy pieces were produced, degreased, roughly etched, treated to remove smut, finely etched, and treated to remove smut. In fact, only the non-chromate treatment with a manganese phosphate system was not performed. No crystalline matter was observed under an electron microscope, and the surface was natural oxide layer of magnesium.

In 2 days, the remaining magnesium alloy pieces were removed, the side with the through hole therein was grasped with a gloved hand to prevent the adhesion of oils, and the pieces were inserted into an injection molding mold at 140° C. The mold was closed and PPS (1) obtained in the Preparation Example 1 was injected at an injection temperature of 310° C. The mold temperature was 140° C., and 14 integrated composites shown in FIG. 2 were obtained. The resin portion had a size of 10 mm×45 mm×5 mm, and the joint surface 6 had a size of 10 mm×5 mm and an area of 0.5 cm². On the molding day, four composites were subjected to a tensile rupture test. The average shear force was 11.3 MPa.

The remaining 10 integrated products were coated with a paint "Omac-Silver Metallic (product name)" to a set thickness of 10 μm and baked for 30 min at a temperature of 170° C. On the next day, the coated products were sprayed with salt water for 8 h at 35° C. by using 5% salt water, followed by washing with water and drying. Fine bulging of the coated film was observed over the entire integrated product. All ten composites were subjected to a tensile rupture test. The shear force had an average value of 7.0 MPa. A brittle oxide film penetrated even onto the rupture surface, and when no conversion treatment was performed, the coating alone was confirmed to make the composite unsuitable for practical use.

Comparative Example 3

An attempt was made to manufacture composites by the same method as that of Example 10, except that the PPS composition (4) of Preparation Example 4 of a PPS composition was used instead of the PPS composition (1) of Preparation Example 1 of a PPS composition. Thus, a test was performed by using a PPS resin composition containing a very large amount of a polyolefin polymer. Such resin material should be called a polyolefin material rather than a PPS material. A large amount of gas was generated during molding, the injection molding was difficult to perform, and the operations were terminated.

Comparative Example 4

An AZ31B magnesium alloy (manufactured by Nippon Kinzoku Kogyo KK, Tokyo, Japan) with a thickness of 0.8 mm and an average metal crystal size on the surface of 7 μm that was subjected to wet buffing as a final surface processing was used. It was cut to 18 mm×45 mm pieces. A through hole was provided in the end portion, a copper wire coated with vinyl chloride was passed through the pieces, and copper wire was bent so that multiple magnesium alloy pieces were not stacked. A total of ten pieces were hung down at the same time.

Figure 6:
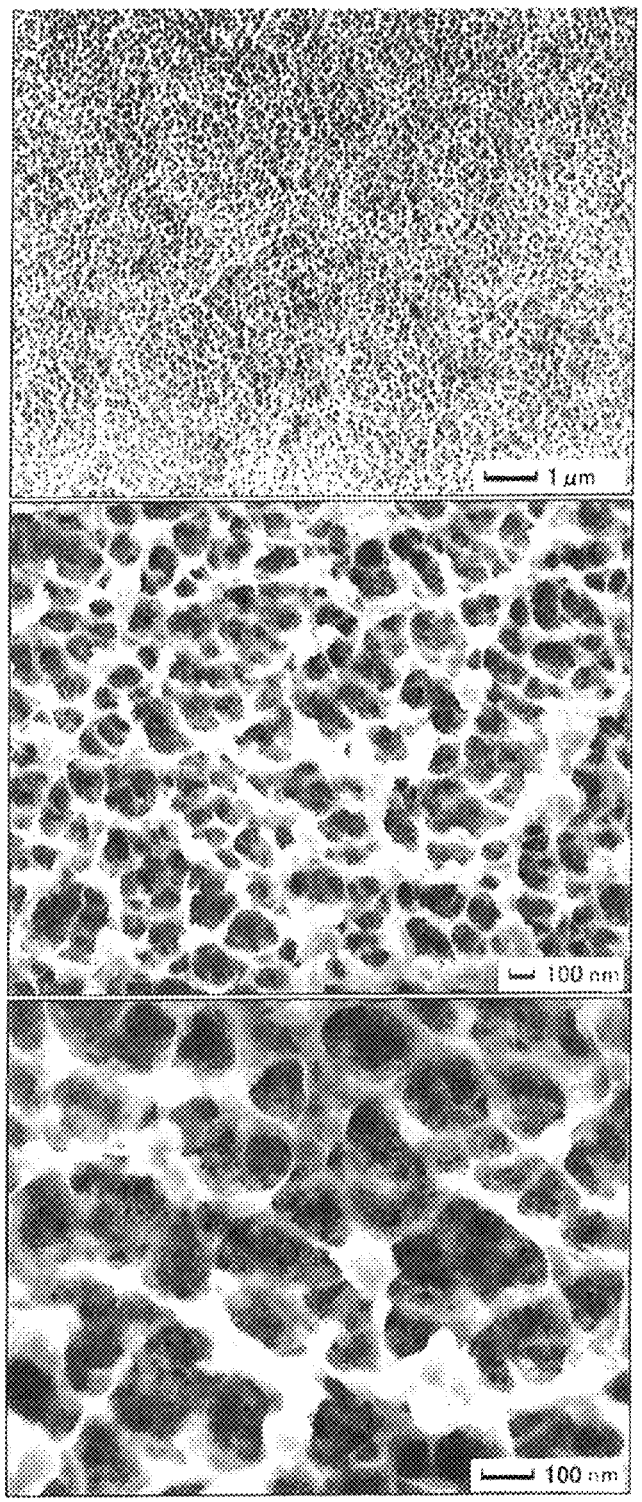
FIG. 6 is a surface photograph of an AZ31B magnesium alloy (manufactured by Nippon Kinzoku Kogyo KK, Tokyo, Japan) with an average grain size of metal crystals of 7 μm that has been subjected only to a degreasing treatment.

A commercial degreasing agent "Cleaner 160" for magnesium alloys was poured into water at 65° C. and dissolved in a degreasing tank to obtain a concentration of 10%. The alloy pieces were immersed therein for 5 min and washed thoroughly with water, and dried for 15 min at 67° C. Thus, this test was designed to verify the joining strength in the case the alloy was subjected only to the degreasing treatment. After 3 days, one piece was observed under an electron microscope. The micrograph thereof is shown in FIG. 6. After one more day has passed, the alloy piece was inserted into an injection molding mold at 140° C., and a PPS composition (1) was injected. The injection molding conditions were identical to those of Example 10. When the injection molding mold was opened, an integrated article was not obtained.

Comparative Example 5

A test was performed in exactly the same manner as in Comparative Example 4, except that the resin used was changed from the PPS composition (1) to the PBT composition (1) and an injection molding condition was the same as that in Example 1. In this case, too, when the injection molding mold was opened, the resin molding and magnesium alloy piece were not integrated.

Table shown below summarizes the results obtained in the above-described examples and comparative examples.

TABLE 1

Summary of Results Obtained in Examples and Comparative Examples

| | Base material | Conversion treatment liquid | Resin (main) | Strength (Mpa) | Notes |
|---|---|---|---|---|---|
| Example 1 | AZ31B | Manganese phosphate system | PBT | 11.9 | |
| Example 2 | AZ31B | Potassium permanganate | PBT | 11.6 | Surface has spherical formations |

TABLE 1-continued

Summary of Results Obtained in Examples and Comparative Examples

| | Base material | Conversion treatment liquid | Resin (main) | Strength (Mpa) | Notes |
|---|---|---|---|---|---|
| Example 3 | AZ31B | Zirconium acetyl acetonate, titanium fluoride | PBT | 7.7 | |
| Example 4 | AZ31B | Zinc acetyl acetonate, titanium sulfate | PBT | 6.9 | |
| Example 5 | AZ31B | Chromic acid | PBT | 6.6 | |
| Example 6 | AZ31B | Potassium carbonate | PBT | 7.0 | |
| Example 7 | AZ31B | Calcium nitrate hydrate, strontium nitrate hydrate | PBT | 7.3 | |
| Example 8 | AZ31B | Vanadium trichloride | PBT | 7.0 | |
| Example 9 | AZ31B | Manganese phosphate system | PPS | 9.3 | Salt water test is possible |
| Example 10 | AZ31B | Manganese phosphate system | PPS, olefin system | 12.8 | |
| Example 11 | AZ31B | Manganese phosphate system | PPS, olefin system | 12.5 | |
| Example 12 | AZ31B | Manganese phosphate system | PPS | 9.0 | Small amount of polyolefin system is added |
| Example 13 | AZ31B | Potassium permanganate | PBT | 15.1 | |
| Example 14 | AZ31B | Potassium permanganate | PBT, PET | 15.8 | |
| Comparative Example 1 | AZ31B | Only etching and treating to remove smut | PBT | 7.4 | Salt water test is impossible |
| Comparative Example 2 | AZ31B | Only etching and treating to remove smut | PPS | 11.3 | Salt water test is impossible |
| Comparative Example 3 | AZ31B | Manganese phosphate system | PPS, olefin system | Molding is impossible | Small amount of polyolefin system is added |
| Comparative Example 4 | AZ31B | Only degreasing | PPS, olefin system | No fixing | |
| Comparative Example 5 | AZ31B | Only degreasing | PBT, PET | No fixing | |

INDUSTRIAL APPLICABILITY

The composite of a metal and a resin and a method for manufacturing same in accordance with the present invention can be used for casings of electronic devices, housings of domestic electric appliances, structural components, machinery parts, and the like. In particular, because magnesium alloys have higher strength and bending elastic modulus per unit weight than aluminum alloys or ferrous metals, they are widely employed for structural materials and parts. Using these properties, it is possible to expect the application thereof to mobile electronic device, body parts of aircrafts, and automobile parts for which light reduction is required.

The invention claimed is:

1. A method for manufacturing a composite of a metal and a resin, comprising:
   a shaping step of obtaining a shaped part from a cast article or an intermediate product composed of a magnesium alloy by shaping by mechanical processing;
   a chemical etching treatment step of forming a surface configuration of the shaped part by immersing the shaped part in an aqueous solution of etching agent,
   a conversion treatment step of forming one species, selected from a metal oxide, a metal carbonate, and a metal phosphate, on a surface layer of the shaped part after the chemical etching treatment has been performed;
   an injection step of inserting the shaped part having been subjected to the chemical etching treatment step and the conversion treatment step into a metallic mold for injection molding and injecting a molten resin composition comprising polyphenylene-sulfide as a main component and modified polyolefin resin as an auxiliary component, or polybutylene-terphthalate as a main component and polyethylene-terephthalate as an auxiliary component and
   a fixing step of introducing and solidifying by the injection molding in concavities of the metal oxide or metal phosphate, and integrally fixing the shaped part and the resin composition;
   wherein said surface configuration of the shaped part formed through the chemical etching treatment and the conversion treatment is such that spherical formations with a diameter of 80 to 120 nm are aggregated to form periodic irregularities with a period of 0.5 to 1 μm.

2. The method for manufacturing a composite of a metal and a resin according to claim 1, wherein the conversion treatment step is a conversion treatment using an aqueous solution of at least one kind selected from chromium, manganese, vanadium, calcium, zinc, strontium, zirconium, a titanium compound, and an alkali metal carbonate.

\* \* \* \* \*